Aug. 8, 1961   F. GABLER ET AL   2,995,643
HEATING DEVICE FOR A MICROSCOPE
Filed April 28, 1959   2 Sheets-Sheet 2

INVENTORS
Fritz Gabler
Roland Mitsche
Wolfgang Wurz
BY Michael S. Striker
ATTORNEY

United States Patent Office 2,995,643
Patented Aug. 8, 1961

2,995,643
HEATING DEVICE FOR A MICROSCOPE
Fritz Gabler, Vienna, Roland Mitsche, Leoben, Styria, and Wolfgang Wurz, Vienna, Austria, assignors to C. Reichert Optische Werke Aktiengesellschaft, Vienna, Austria, a firm
Filed Apr. 28, 1959, Ser. No. 809,422
Claims priority, application Austria Apr. 30, 1958
16 Claims. (Cl. 219—19)

This invention concerns heating devices positionable on the stage of a microscope for incident light.

The properties of a great many materials which find technical employment today depend not only upon their chemical composition, but are also influenced decisively by their physical structure. The structure of such materials, which include pure and alloyed metals as well as ceramic and organic substances, can be favourably or unfavourably changed by the treatments to which they are subjected during manufacture. Consequently, the study of material structures is of great technical importance, and it is particularly important to be able to ascertain the structural changes which materials undergo when subjected to various treatments. Perhaps the most important field of study concerns the structural changes undergone by metals and their alloys, especially steels and other iron alloys, upon heat treatment.

A great many methods and devices for studying the effects of the heat treatment of materials have, therefore, been proposed. Of these known methods those in which metallic or other specimens are heated in situ upon the stage of a reflection microscope, usually in an atmosphere of protective gas, are of particular importance since they make it possible directly to observe and record the changes undergone by the specimen.

The heating devices which have hitherto been proposed for use in conjunction with microscopes suffer, however, from a number of disadvantages. Above all their thermal inertia is usually far too great, since not only the specimen and the immediately adjacent parts but also in general too great a mass of other associated parts of the device must be heated and cooled. When it is desired to plot temperature transformation curves it is consequently found impossible to heat or cool the specimen sufficiently quickly. A further disadvantage associated with known heating devices of this type is that they frequently incorporate thermal and electrical insulating members, formed of ceramic or other synthetic materials, which attain temperatures comparable to those to which the specimen is subjected. Members formed of such materials are almost invariably good adsorbents of gas, which they will give off in large amounts when introduced into a high vacuum, especially when heated. Their presence thus interferes seriously with the attainment of satisfactory high vacuum conditions within the heating device, initially at least. Finally, moreover, the devices hitherto known have been generally unsatisfactory inasmuch as their assembly and disassembly, for the purpose of changing specimens, as well as their manipulation during the course of an experiment, have presented undesirable complexities.

Amongst the objects of the present invention is to provide a heating device suitable for use in conjunction with a microscope and which may be simply assembled and dis-assembled, which so far as possible avoids the presence of material of an adsorbent nature, and ensures that such as must be present is maintained always at a relatively low temperature, and which above all concentrates and restricts the heat in a region immediately adjacent the specimen defined by parts of small thermal inertia, so that rapid heating and cooling of the specimen can be achieved.

In its broadest aspect the invention comprises a heating device positionable upon the stage of a microscope for incident light whose housing assembly consists essentially of two separable segments, the first of which provides a support intended to mount and permit microscopic observation of the specimen, and the second of which includes one or more high-tension heating means so arranged that upon assembly of the housing these means surround and substantially completely enclose the specimen.

The mounting support for the specimen is of course such as to permit observation thereof by the microscope objective. A plurality of electrical heating elements are desirably supported by rods which also provide electrical connections for said elements, which are advantageously so arranged that they define a box-like heating chamber around the sides and over the top of the specimen when the housing is assembled. This arrangement permits simple dis-assembly of the housing, convenient location of the specimen in a reproducible position relative to the microscope objective, and rapid reassembly of the heating device with the heating elements in close proximity to the specimen yet without fear of disturbing it during assembly. The close proximity of the heating elements to the specimen, and its substantially complete enclosure thereby, ensures that the heating effect is highly concentrated in this region and heat dispersal is minimized.

In order further to reduce heat dispersal the support rods for the heating elements are made preferably of a metal with a relatively low heat conductivity, such as chrome-nickel steel or Monel-metal, and may advantageously also be of hollow construction, means being then provided for introducing a cooling fluid within the hollow support rods. Additional cooling arrangements are preferably also provided in the walls of the device and at the electrical terminals. In order still further to concentrate and retain the heat adjacent the specimen, the heating elements can also be given a wavy or meandering contour.

The heating device will also usually include junction pieces for connection to a vacuum pump as well as for the introduction of a protective gas, the latter preferably in such a manner that it can be directed onto the specimen. A lock is also preferably provided through which solid, liquid or gaseous materials can be introduced into the device in any desired quantity so as to etch the surface of the specimen.

Means are with advantage provided whereby the effects of condensate forming upon the observation window of the device can be avoided. For example, interchangeable quartz glass plates or opaque discs can be introduced between the surface of the specimen under observation and the observation window, which can be substituted one for another when vaporized material condenses on the plate and obstructs vision. Such interchangeable plates may be mounted on a slide secured to an iron bar moveable in a non-magnetic sheath and hence controllable from outside the device by means of a magnet; interchange of the plates can of course also be effected in any other convenient manner, including the use of pivoted magnets. Alternatively, the tendency for condensate to form can be minimised by providing a quartz glass plate between the specimen and the observation window, supported upon a metallic member thermally insulated from the rest of the device, with the result that radiation from the specimen heats up the support member and hence the plate, and renders deposition of condensate unlikely. Again, such a metallic support member can instead be directly heated by passage of an electric current, derived for exampe in shunt from the current fed to the heating elements.

It is, of course, to be understood that all those parts of the device immediately adjacent to the heating zone should very desirably be formed of materials unlikely to vaporize at the high temperatures engendered, such as for example quartz glass or tungsten, in order that they shall not themselves give rise to condensate upon the observation window.

Other objects and advantages of the invention will be better understood from a consideration of two preferred embodiments which will now be described though merely by way of illustration with reference to the accompanying drawings, in which.

Figure 1:
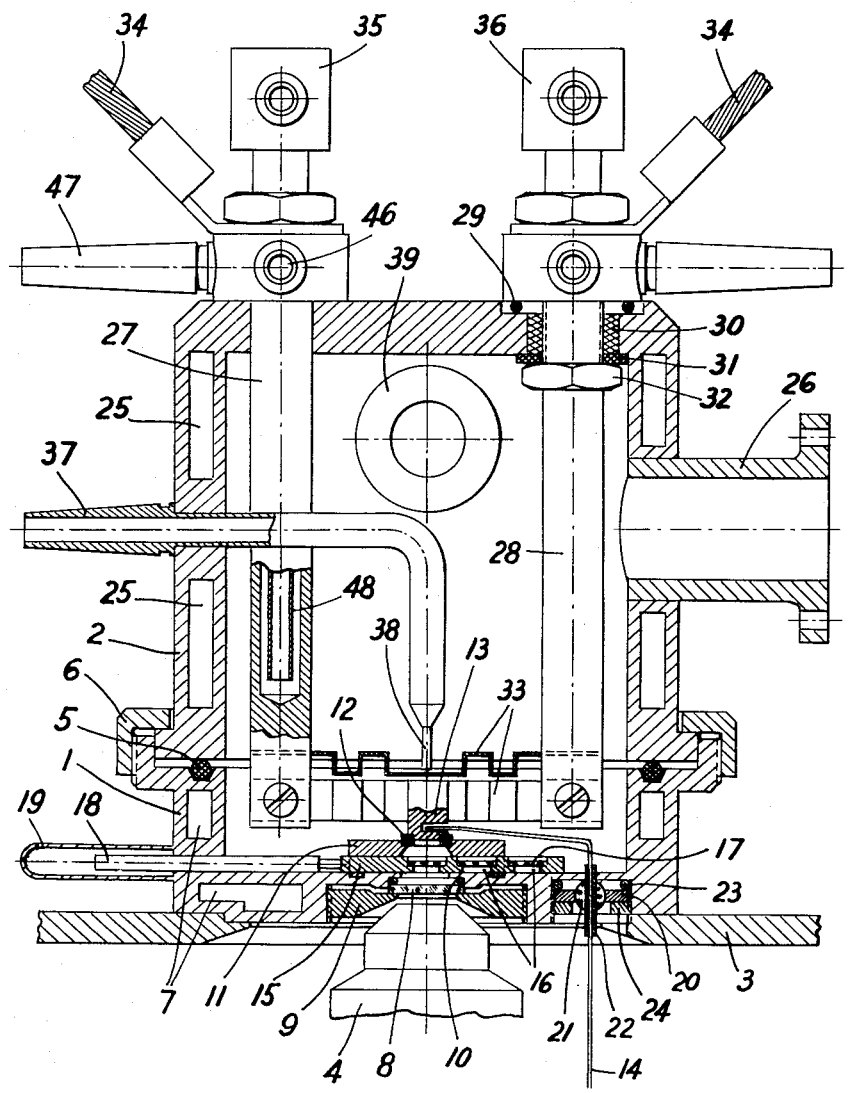
FIGURE 1 is a front-elevational view, larely in cross-section, of the heating device supported on the stage of a microscope for incident light.

Referring to FIGURE 1, the heating device consists of two main parts, a lower segment 1 and an upper segment 2. The device as a whole is supported on the stage 3 of a microscope for incident light (according to Le Chatelier). Observation is thus conducted through the microscope objective 4 from beneath and through an aperture in stage 3. The segments 1 and 2 are both formed of stainless steel, and supported one upon the other via an intermediate rubber or like sealing ring 5. The segments 1 and 2 are drawn into sealing engagement with one another and the ring 5 by means of clamping ring 6. The walls of the lower segment 1 are hollow, and cooling water, led in through several pipes omitted from the drawings for the sake of clarity, can be circulated through chambers 7. A central aperture is provided in the base of lower segment 1, covered by a quartz glass plate 8. In order to make this aperture completely air-tight, even against high-vacuum, the quartz glass plate 8 is clamped by frontal screw ring 9 against a rubber or like sealing ring 10, which for its part is received in a recess provided in the bottom of the lower segment 1. An annular recess on the inner side of the bottom of segment 1 and concentric with the observation aperture receives the flanged rim of an annular washer 11, in which, likewise centrally, there is mounted a ring 12 of quartz glass or aluminium oxide, on which the test specimen 13 rests.

The annular washer 11 is so constructed that a slide 15 which supports a number of thin quartz glass panes 17 in each of the apertures 16 is movably mounted therein. One end of an iron bar 18 is fastened to the slide 15, and its other end extends into a casing 19 of non-magnetic material attached in an air-tight manner to the lower segment 1. It is then possible with the aid of a magnet (not shown) to move the iron bar 18 and consequently the slide 15 from outside the device, so that as desired any one of the quartz glass plates 17 or alternatively an opaque part of the slide 15 can be positioned between specimen 13 and objective 4.

In the bottom of the lower segment 1 a vacuum-tight arrangement for introducing the electrical connections for a thermocouple is incorporated. This arrangement comprises a flange 20 and an insulating bead 21 traversed by two tubes 22. Through the tubes 22 pass the two wires of a thermocouple 14 whose hot junction is inserted into a bore made in the specimen 13 which is under examination. The imperviousness to air of this arrangement is ensured by soldering the wires of the thermocouple within the tubes 22 and, so far as concerns the flange 20, by means of a rubber or like sealing ring 23 and fronted screw ring 24.

The upper segment 2 of the heating device, like the lower segment already described, can be cooled by passing water or other liquid through the hollow chambers 25. A flanged connecting pipe 26 is provided to permit attachment of the heating device to a high-vacuum pump assembly (not shown). Two support rods 27 and 28, formed of chrome-nickel steel with a low thermal conductivity, are inserted through the top of upper segment 2. Rod 27 is in electrical connection with segment 2, but rod 28 is insulated therefrom by a rubber spacing ring 29, insulating collar 30 and insulating washer 31. This assembly is rendered impervious to air by tightening up clamping nut 32.

Between the lower ends of rods 27 and 28, high tension heating means here shown as three strip-like heating elements 33 formed of tungsten are disposed. The heating current flows to and from the heating elements 33 via the respective support rods and the associated cables 34. The three heating elements 33 are disposed so as to surround and enclose the specimen from substantially all sides save that from which it is supported and observed, and individually each element is contoured in a wavy manner, so that its path between the support rods 27 and 28 follows a meandering course. This contouring of the heating elements aids in preventing too rapid a dispersal of the Joule heating generated in the region of the specimen 13.

In order to keep down the temperature of the electrical terminals to which cables 34 are attached, and hence to keep the top of the upper segment 2 cool, further water cooling arrangements schematically indicated at 35 and 36 are mounted externally of the heating device upon upward extensions of the support rods 27 and 28, so as to permit rapid cooling of both the device and the specimen 13 when the current supply is disconnected. The support rods 27 and 28 are of hollow construction, and their interior communicates through outlets 46 with the external atmosphere. Within each hollow rod lies a pipe 48 terminating in a discharge nozzle (as shown in the cut-away section of rod 27) and externally each pipe communicates with an inlet connection 47 through which gas, e.g. compressed air can be blown to cool the inside of the support rods 27 and 28. For the purpose of bringing about positive cooling of specimen 13 a gas conduit 37 terminating at a nozzle 38 immediately adjacent the specimen 13 is introduced through the wall of segment 2 in an air-tight manner. When it is wished to cool the specimen a current of an inert gas, such for example as argon, is blown through conduit 37 and nozzle 38 and passes through an aperture in the uppermost heating element 33 onto the hot specimen, which, being of comparatively small mass, cools off in a matter of seconds.

Figure 2:
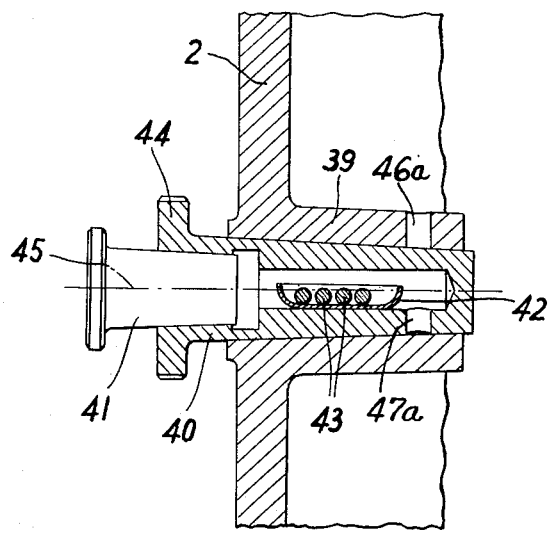
FIGURE 2 is a side-elevational cross-sectional view of a detail of FIGURE 1.

A lock arrangement whereby the atmosphere within the heating device may be influenced is generally indicated at 39 in FIGURE 1 and shown in more detail in FIGURE 2. It represents an internally-projecting boss 39 formed on the wall of segment 2, having a frusto-conical bore extending therethrough. A hollow plug 40 of corresponding conical shape is fitted therein, whose hollow interior can in turn be shut off from the outside with the aid of a frusto-conical stopper 41. Into the compartment formed within the plug 40 may be inserted a little boat 42, adapted to receive solid or liquid etchant 43. When the plug 40 is turned by its milled edge 44 about the axis 45 through an angle of 180° from the position shown in FIGURE 2 its interior then communicates with the inside of the heating device through passages 46a and 47a. If the device is evacuated the etchant 43 will thus be induced to vaporise. If neither solid nor liquid but gaseous etchants are to be used then the boat 42 may be dispensed with, and the whole of the interior of the device may be filled with any desired gaseous etchant after removal of the stopper 41.

In operation the specimen 13 is set in position within the lower segment 1, the upper segment 2 is then placed over it, and the heating device assembled by tightening clamping ring 6. Once assembled, the device is repeatedly evacuated via the pump connection 26 and in between flushed out with a protective gas, e.g. argon, introduced through the conduit 37. It is finally brought to a residual argon pressure of between at most $10^{-4}$ and $10^{-5}$ Torr. The wires of the platinum-platinum/rhodium thermocouple, whose hot junction was previously inserted into the bore in specimen 13, are of course connected to a measuring instrument. By appropriately heating elements 33 or alternatively by admitting argon into the evacuated heating device, it is possible to establish any desired temperature (within the limit specified hereinafter), and also to control the temperature variation at will.

It is thus possible with a single specimen and in the shortest possible time not only to observe structural changes, melting or sublimation characteristics, and so on, but also photographically or cinematographically to record all these phenomena, and in so doing simultaneously to register the associated temperature changes as a function of time. No difficulties are encountered in attaining specimen temperatures of up to 1600° C., and if the thermocouple employed is formed of high melting point metal wires, such as an iridium-iridium/rhodium thermocouple, even higher temperatures can be attained and their effects studied. The additional employment of special lighting and observation methods, such as those of phase and interference contrast microscopy, and illumination with polarised light, makes it possible to observe practically all the surface changes which can occur.

Figure 3:
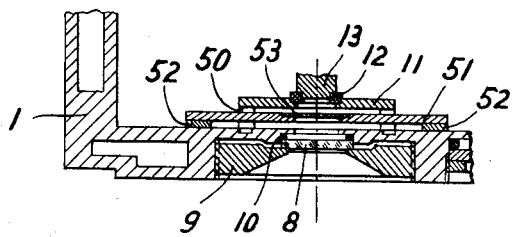
FIGURE 3 is a part front-elevational cross-sectional view similar to that shown in FIGURE 1 of another embodiment of the invention.

A further refinement of the invention is shown in FIGURE 3, which illustrates a detail of the construction shown in FIGURE 1. As before, the lower segment of the device is indicated 1 and includes an observation window 8 which is packed by means of rubber ring 10 and frontal screw ring 9. In a recess in the bottom of segment 1 concentric with the window 8 there is mounted the rim of washer 11, which supports the specimen 13 on the quartz glass ring 12. A channel 50 is cut out of the washer 11 through which passes a heating element in the form of a bridging member 51 formed of tungsten strip and carried externally of the washer by bearing supports 52 formed of quartz glass. The bridging member 51 supports a quartz glass plate 53 between the specimen 13 and the observation window 8. The heat emitted from the specimen 13 onto the quartz glass plate 53 heats up this plate as well as the bridging member 51, because the escape of heat is hindered by the heat insulating supports 52. Consequently the tendency of vaporised material from the specimen to condense on the plate 53 is greatly reduced, ensuring that the path of observation through window 8 and plate 53 is very unlikely to become obstructed by condensate.

We claim:

1. A heating device adapted to be placed onto the stage of a microscope to permit microscopic examination of a specimen, said device comprising, in combination, a housing including two separable segments, one of said segments constituting a support for and comprising means permitting microscopic observation of the specimen; electric heating means provided in the interior of the other segment and arranged in such a way as to at least partially enclosed the specimen when said other segment is assembled with said one segment; and means for supplying electric current to said heating means.

2. A heating device adapted to be placed onto the stage of a microscope for incident light to permit microscopic examination of a specimen, said device comprising, in combination, a housing including two separable segments, one of said segments constituting a support for and comprising means permitting microscopic observation of the specimen; electric high-tension heating means provided in the interior of the other segment and arranged in such a way as to at least partially enclose the specimen when said other segment is assembled with said one segment; and means for supplying electric current to said heating means, said current supplying means comprising a plurality of rod-like conductors supportingly connected with said heating means, one of said conductors extending through said housing, and means constituting an electrical insulation between said one conductor and said housing.

3. A heating device adapted to be placed onto the stage of a microscope for incident light to permit microscopic examination of a specimen, said device comprising, in combination, a housing including two separable segments, one of said segments constituting a support for and comprising means permitting microscopic observation of the specimen; electric high-tension heating means provided in the interior of the other segment and arranged in such a way as to at least partially enclose the specimen when said other segment is assembled with said one segment; and means for supplying electric current to said heating means, said current supplying means comprising a plurality of rod-like conductors, said conductors consisting of a metallic material having low heat conductivity and supportingly connected with said heating means, one of said conductors extending through said housing, and means constituting an electrical insulation between said one conductor and said housing.

4. A heating device adapted to be placed onto the stage of a microscope for incident light to permit microscopic examination of a specimen, said device comprising, in combination, a housing including two separable segments, one of said segments constituting a support for and comprising means permitting microscopic observation of the specimen; electric high-tension heating means provided in the interior of the other segment and arranged in such a way as to at least partially enclose the specimen when said other segment is assembled with said one segment; and means for supplying electric current to said heating means, said current supplying means comprising a plurality of hollow rod-like conductors supportingly connected with said heating means, one of said conductors extending through said housing, means for introducing a coolant into said conductors, and means constituting an electrical insulation between said one conductor and said housing.

5. A heating device adapted to be placed onto the stage of a microscope to permit microscopic examination of a specimen, said device comprising, in combination, a housing including two separable segments, one of said segments constituting a support for and comprising means permitting microscopic observation of the specimen; electric heating means comprising strips of meandering contour provided in the interior of the other segment and arranged in such a way as to at least partially enclose the specimen when said other segment is assembled with said one segment; and means for supplying electric current to said heating means.

6. A heating device adapted to be placed onto the stage of a microscope for incident light to permit microscopic examination of a specimen, said device comprising, in combination, a housing including two separable segments, one of said segments constituting a support for and comprising means permitting microscopic observation of the specimen, and at least one of said segments having wall means formed with coolant-receiving chamber means; electric high-tension heating means providing in the interior of the other segment and arranged in such a way as to at least partially enclose the specimen when said other segment is assembled with said one segment; and means for supplying electric current to said heating means, said current supplying means comprising electrical terminal means mounted on said housing means, and an arrangement for cooling said terminal means.

7. A heating device adapted to be placed onto the stage of a microscope to permit microscopic examination of a specimen, said device comprising, in combination, a housing including two separable segments, one of said segments constituting a support for and comprising means permitting microscopic observation of the specimen; electric heating means provided in the interior of the other segment and arranged in such a way as to at least partially enclose the specimen when said other segment is assembled with said one segment; means for supplying electric current to said heating means; means provided on said housing and constituting a connection for a vacuum pump assembly; and conduit means mounted in said housing and constituting a connection for introduction of protective gas into said housing.

8. A heating device adapted to be placed onto the stage of a microscope to permit microscopic examination of a specimen, said device comprising, in combination, a housing including two separable segments, one of said segments constituting a support for and comprising means permitting microscopic observation of the specimen; electric heating means provided in the interior of the other segment and arranged in such a way as to at least partially enclose the specimen when said other segment is assembled with said one segment; means for supplying electric current to said heating means; means provided on said housing and constituting a connection for a vacuum pump assembly; and conduit means mounted in said housing and constituting a connection for introduction of protective gas into said housing, said conduit means extending into close proximity of the specimen in said housing.

9. A heating device adapted to be placed onto the stage of a microscope for incident light to permit microscopic observation of a specimen, said device comprising, in combination, a housing including two separable segments, one of said segments constituting a support for and comprising means permitting microscopic observation of the specimen; electric high-tension heating means provided in the interior of the other segment and arranged in such a way as to at least partially enclose the specimen when said other segment is assembled with said one segment; means for supplying electric current to said heating means; and means for introducing measured quantities of etchant material into said housing.

10. A heating device adapted to be placed onto the stage of a microscope for incident light to permit microscopic observation of a specimen, said device comprising, in combination, a housing including two separable segments, one of said segments constituting a support for and comprising means permitting microscopic observation of the specimen; electric high-tension heating means provided in the interior of the other segment and arranged in such a way as to at least partially enclose the specimen when said other segment is assembled with said one segment; means for supplying electric current to said heating means; and means for introducing measured quantities of etchant material into said housing, said last mentioned means comprising a boss provided on said housing, said boss formed with a conical bore communicatively connecting the interior of said housing with atmosphere, and with passage means communicating with said bore and with the interior of said housing, a hollow conical plug inserted into said bore, said plug defining an internal compartment communicating with atmosphere and the plug formed with second passage means communicating with said compartment and with said first mentioned passage means when the plug is rotated in said boss, stopper means inserted into said plug for sealing said compartment from atmosphere, and a boat for etchant material received in said compartment.

11. A heating device adapted to be placed onto the stage of a microscope for incident light to permit microscopic examination of a specimen, said device comprising, in combination, a housing including two separable segments, one of said segments constituting a support for and comprising a window permitting microscopic observation of the specimen; electric high-tension heating means provided in the interior of the other segment and arranged in such a way as to at least partially enclose the specimen when said other segment is assembled with said one segment; means for supplying electric current to said heating means; and means for preventing the deposition of condensate on said window.

12. A heating device adapted to be placed onto the stage of a microscope for incident light to permit microscopic examination of a specimen, said device comprising, in combination, a housing including two separable segments, one of said segments constituting a support for and comprising a window permitting microscopic observation of the specimen; electric high-tension heating means provided in the interior of the other segment and arranged in such a way as to at least partially enclose the specimen when said other segment is assembled with said one segment; means for supplying electric current to said heating means; and means for preventing the deposition of condensate on said window, said last mentioned means comprising a plurality of transparent plates and means for shifting said plates with respect to said window.

13. A heating device adapted to be placed onto the stage of a microscope for incident light to permit microscopic examination of a specimen, said device comprising, in combination, a housing including two separable segments, one of said segments constituting a support for and comprising a window permitting microscopic observation of the specimen; electric high-tension heating means provided in the interior of the other segment and arranged in such a way as to at least partially enclose the specimen when said other segment is assembled with said one segment; means for supplying electric current to said heating means; and means for preventing the deposition of condensate on said window, said last mentioned means comprising a plurality of transparent plates, a slide mounting said plates in a common plane and slidably mounted between the specimen and said window, and means for shifting said slide with respect to said window, said shifting means comprising a member of magnetizable material.

14. A heating device adapted to be placed onto the stage of a microscope for incident light to permit microscopic examination of a specimen, said device comprising, in combination, a housing including two separable segments, one of said segments constituting a support for and comprising a window permitting microscopic observation of the specimen; electric high-tension heating means provided in the interior of the other segment and arranged in such a way as to at least partially enclose the specimen when said other segment is assembled with said one segment; means for supplying electric current to said heating means; and means for preventing the deposition of condensate on said window, said last mentioned means comprising a bridge member of substantially non-vaporizable metal mounted on said one segment between the specimen and said window, a transparent plate mounted on said bridge member and adjacent to the specimen, and means constituting a thermal insulation between said bridge member and said one segment whereby radiant heat emitted by the specimen heats up said plate and said bridge member to prevent the deposition of condensate thereon.

15. A heating device adapted to be placed onto the stage of a microscope for incident light to permit microscopic examination of a specimen, said device comprising, in combination, a housing including two separable segments, one of said segments constituting a support for and comprising a window permitting microscopic observation of the specimen; electric high-tension heating means provided in the interior of the other segment and arranged in such a way as to at least partially enclose the specimen when said other segment is assembled with said one segment; means for supplying electric current to said heating means; and means for preventing the deposition of condensate on said window, said last mentioned means comprising a transparent plate located between said window and the specimen, and an electric heating element for supporting and for heating said plate, said heating element connected in the circuit of said heating means.

16. A heating device adapted to be placed onto the stage of a microscope to permit microscopic examination of a specimen, said device consisting of difficultly vaporizable materials and comprising, in combination, a housing including two separable segments, one of said segments constituting a support for and comprising means permitting microscopic observation of the specimen; electric heating means provided in the interior of the other segment and arranged in such a way as to at least partially enclose the specimen when said other segment is assembled with said one segment; and means for supplying electric current to said heating means.

References Cited in the file of this patent

UNITED STATES PATENTS

| | | |
|---|---|---|
| 1,940,256 | Krebs | Dec. 19, 1933 |
| 2,203,452 | Berghous et al. | June 4, 1940 |
| 2,232,354 | Weygang | Feb. 18, 1941 |
| 2,651,236 | Kahler | Sept. 8, 1953 |
| 2,709,842 | Findlay | June 7, 1955 |

FOREIGN PATENTS

| | | |
|---|---|---|
| 730,203 | Great Britain | May 18, 1955 |
| 930,469 | Germany | July 18, 1955 |

OTHER REFERENCES

Gordon et al.: "Journal Scientific Insts.," vol. 22, January 1945, pp. 12–14.

Patterson et al.: "The Review of Scientific Insts.," volume 29, No. 12, December 1958, pp. 1141–1142.

Sundquist: "The Review of Scientific Instruments," volume 31, No. 4, April 1960, pp. 425–7.